Aug. 23, 1927.

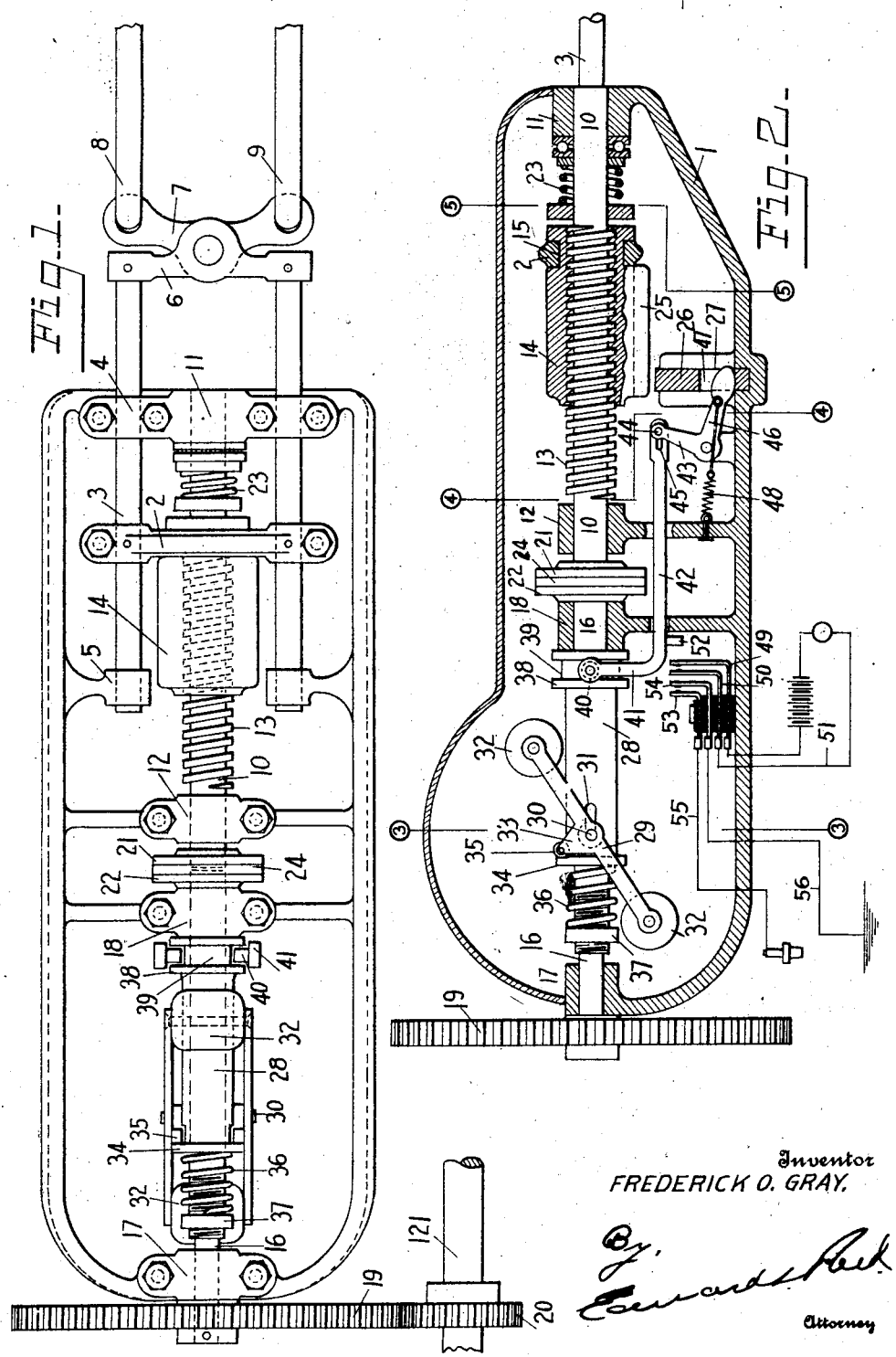

F. O. GRAY 1,640,149

SPEED CONTROLLING DEVICE FOR MOTOR DRIVEN VEHICLES

Filed Oct. 27, 1923  3 Sheets-Sheet 2

Inventor
FREDERICK O. GRAY.

By Edward Reed

Attorney

Aug. 23, 1927.  
F. O. GRAY  
1,640,149  
SPEED CONTROLLING DEVICE FOR MOTOR DRIVEN VEHICLES  
Filed Oct. 27, 1923  3 Sheets-Sheet 3
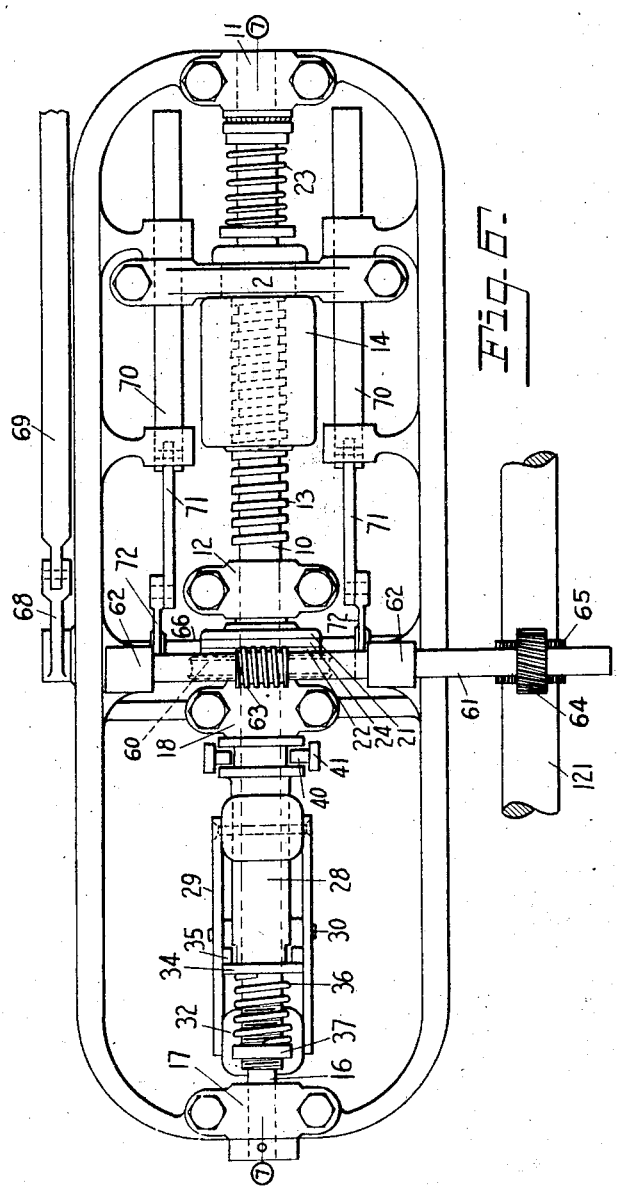
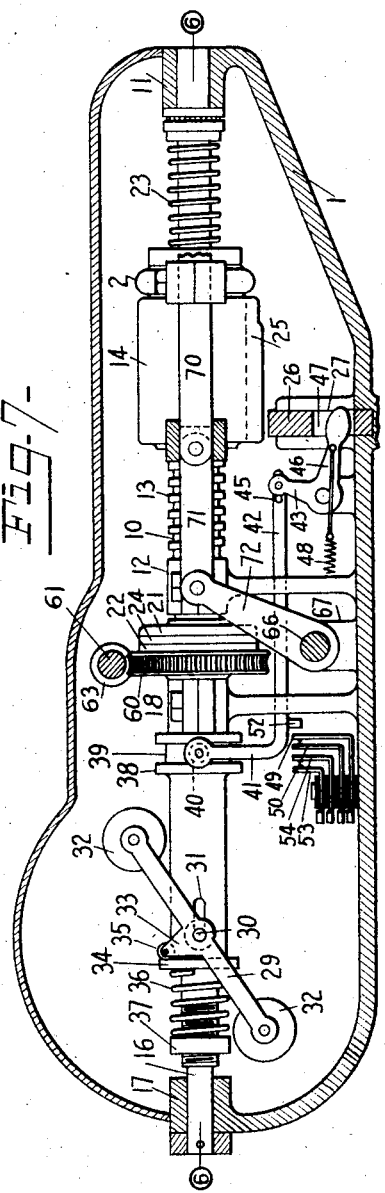
INVENTOR.  
FREDERICK O. GRAY.  
BY  
ATTORNEY.

Patented Aug. 23, 1927.

1,640,149

UNITED STATES PATENT OFFICE.

FREDERICK O. GRAY, OF DAYTON, OHIO.

SPEED-CONTROLLING DEVICE FOR MOTOR-DRIVEN VEHICLES.

Application filed October 27, 1923. Serial No. 671,094.

This invention relates to a speed controlling device for motor driven vehicles and the like.

One object of the invention is to provide a device which will automatically interrupt the transmission of power to the vehicle when the latter exceeds a certain predetermined speed.

A further object of the invention is to provide a device of this kind in which the power of the motor may be utilized for manipulating the clutch, brake or other part which may be actuated to regulate the speed.

A further object of the invention is to provide such a device which may be easily applied to a motor driven vehicle without changing the construction or the arrangement of the parts thereof.

A further object of the invention is to provide such a device which will be simple in its construction and positive in its operation.

Other objects of the invention will appear as the device is described in detail.

Figure 3:
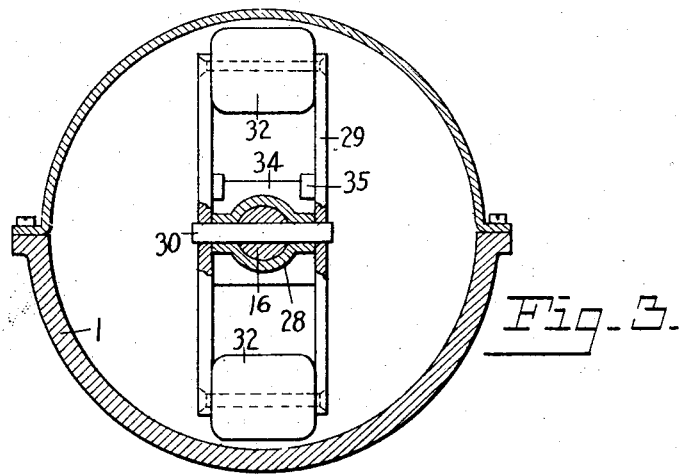
Figure 4:
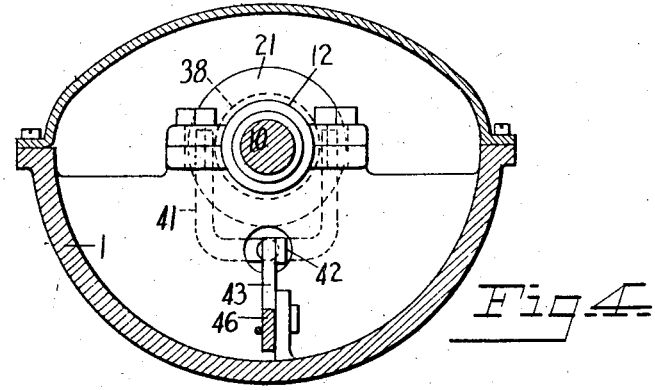
Figure 5:
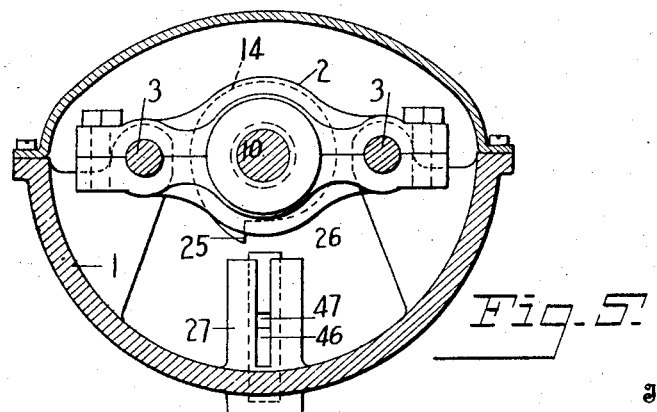

In the accompanying drawings Fig. 1 is a top plan view of the mechanism, with the upper portion of the casing removed; Fig. 2 is a longitudinal sectional view taken centrally through the mechanism; Fig. 3 is a transverse section taken on the line 3—3 of Fig. 2; Fig. 4 is a transverse section taken on the line 4—4 of Fig. 2; Fig. 5 is a transverse section taken on the line 5—5 of Fig. 2; Fig. 6 is a top plan view of a slightly modified form of the device; and Fig. 7 is a longitudinal section taken through the device of Fig. 6 on the line 7—7.

In these drawings I have illustrated one embodiment of my invention, together with certain modifications thereof, and have shown the same as embodied in a device designed for use with motor driven vehicles but it will be understood that this particular embodiment of the invention has been chosen for the purposes of illustration only and that the device may be utilized for controlling the speed of machines of various kinds, and, further, that the mechanism may take various forms without departing from the spirit of the invention.

In carrying out my invention I provide an actuating device which is connected with the clutch or other part which is to be operated to reduce the speed of the machine and means are provided for operatively connecting this actuating device as a positively driven part of the mechanism. The connection between the actuating device and the positively driven part of the mechanism is controlled by the speed at which the machine is operated so that when the machine reaches a certain predetermined speed an operative connection will be established between the actuating device and the motor which operates the machine and the actuating device will be caused to operate the clutch or other part to be operated. In that particular embodiment of the invention illustrated, the several parts of the mechanism are enclosed in a casing 1 which constitutes a main frame upon which the several parts of the mechanism may be mounted. The actuating device is mounted within this casing and is here shown in the form of a cross head 2 which is rigidly secured at its respective ends to rods 3 slidably mounted in bearings 4 and 5 in the casing and adapted to be operatively connected with the part to be operated. As shown in Figs. 1 and 2, the outer end portions of these rods extend beyond the adjacent end of the casing and are rigidly connected one to the other by a cross bar 6. Pivotally mounted on this cross bar is an equalizing bar 7, one end of which is connected with a clutch operating rod 8 and the other end of which is connected with a brake operating rod 9. While I have here shown the actuating device as connected both to the clutch and the brake it will be understood that this device may be connected with either the brake alone or the clutch alone or may be connected with any other part the operation of which will control the speed of the vehicle. The operating means for the actuating device comprises a shaft 10 extending lengthwise of the casing 1 and journaled near its ends in bearings 11 and 12. This shaft is provided with a spiral rib or screw thread 13 which extends for the greater portion of the length thereof. Mounted upon the screw threaded portion of the shaft is a connecting device, here shown in the form of a nut 14, having internal threads to cooperate with the threads of the shaft 10 so that when the nut is held against rotation it will be caused to move lengthwise of the shaft. The nut 14 is operatively connected with the actuating device 2, this connection being preferably accomplished by providing the nut with a circumferential groove 15, near one end thereof, and mounting the actuating device in this groove, so that the nut may rotate freely with relation to the acutating device but will be held against axial movement relatively thereto. In this manner when the rotation of the nut is interrupted the continued rotation of the shaft 10 will impart axial movement to the nut and cause operative movement to be imparted to the actuating device.

The shaft 10 is preferably driven from the motor of the vehicle so that the power of the motor may be utilized for actuating the clutch or other part to be operated. This connection may take various forms but, in the present instance, I have mounted within the casing 1 a second shaft 16 which is journaled in bearings 17 and 18 and is provided with means for connecting it with the motor. This connection may be established through any suitable moving part of the mechanism, such as one of the wheels of the vehicle, the propeller shaft or, if desired, with the engine shaft itself. However, I prefer not to utilize the engine shaft for this purpose as the speed of the engine shaft is not maintained at a fixed ratio to the speed of the vehicle, due to the shifting of the variable speed transmission mechanism which is interposed between the same and the driving wheels of the vehicle. As shown in Figs. 1 and 2, the end of the shaft 16 extends beyond the rear end of the casing 1 and has rigidly secured thereto a gear 19 which meshes with a pinion 20 on a propeller shaft 121. Obviously, however, this connection may be of any suitable character and may be made with the propeller shaft either within or without the transmission casing. The motor driven shaft 16 is, in the present instance, arranged in axial alinement with the screw threaded shaft 10 and the connection between these shafts is of such a character that the rotation of the screw threaded shaft 10 may be interrupted without interrupting the rotation of the motor driven shaft. To this end I have established a frictional connection between the two shafts, which may consist of opposed disks 21 and 22 rigidly secured, respectively, to the shafts 10 and 16. One of the shafts, in the present instance the shaft 10, is capable of a slight longitudinal movement and is acted upon by a spring 23 which tends to move the same toward the shaft 16 and to thus hold the two friction disks in proper relation. If desired, an intermediate disk or wear plate 24 may be interposed between the disks 21 and 22. The actuating device 2 holds the nut 14 normally against axial movement and therefore this nut merely rotates with the screw threaded shaft. It will be understood that the clutch or other part to be operated is usually held in its normal position by a relatively stiff spring the action of which must be overcome before the actuating device 2 can be moved rearwardly.

While there exists a mechanical connection between the actuating device and its operating shaft 10 this connection is normally an inoperative one and in order to render this connection operative means are provided for interrupting the rotation of the connecting member or nut 14, and this means is controlled by the speed at which the vehicle is moving. In the present construction the nut 14 is provided with a longitudinal shoulder 25 projecting from one side thereof and constituting a stop. A movable stop is mounted within the casing for movement into and out of the path of the shoulder 25 on the nut 14 and, as here shown, this movable stop is in the form of a plunger 26 slidably mounted in a guideway 27. The controlling means for the plunger may take any suitable form but I prefer to utilize a centrifugal governor for this purpose and to this end I have mounted on the shaft 16 a sleeve 28 which is slidable lengthwise of that shaft. The governor comprises an elongated frame consisting of bars 29 arranged on the opposite sides of the shaft 16 and pivotally mounted between their ends on a pin 30 which is mounted in the shaft 16 and the end portions of which extend, respectively, through slots 31 in the sleeve 28. The frame members 29 are provided at their outer ends with weights 32. Each frame member is provided adjacent to the pin 30 with a projection or arm 33 adapted to engage a flange 34 at the end of the sleeve 28, the arms being preferably provided with anti-friction rollers 35. The arms 33 are so arranged with relation to the frame of the governor that when the weights are moved outwardly by centrifugal force the arms 33 will act on the flange 34 and cause the sleeve 28 to be moved lengthwise of the shaft, toward the rear. A spring 36 coiled about the shaft 16, between the end of the sleeve and a nut 37 on the shaft, tends to move the sleeve toward its normal or foremost position and to resist the outward movement of the governor weights. The sliding movement of the sleeve 28, under the influence of the centrifugal governor, is utilized to control the movement of the plunger 26 which controls the rotation of the nut or connecting member 14. As here shown, the sleeve 28 has at its forward end a collar 38 provided with a circumferential groove 39 to receive pins 40 carried by the two arms of a yoke 41 rigidly secured to and forming part of a bar 42 slidably mounted on the frame and extending forwardly from the sleeve. The forward end of this bar 42 is connected with an actuating device or trigger by means of which movement is imparted to the plunger. In the present instance, this actuating device consists of a bell crank lever the upper arm 43 of which is connected with the bar 42 by means of a pin 44 extending through a longitudinal slot 45 in the bar. The other arm 46 of the actuating device extends into an opening or slot 47 in the plunger. The length of this opening is, however, such that the initial movement of the actuating device will not impart movement to the plunger and consequently the plunger will not be operated until the governor has been moved outwardly to a certain predetermined position, which position is determined by the speed to which it is desired to limit the vehicle. The actuating device is acted upon by a spring 48 which is so arranged that it will move the arm 46 into either its uppermost or lowermost position, after initial movement has been imparted thereto in the desired direction. As here shown, this spring is connected at one end with the arm 46 of the actuating device and at its other end with a fixed part of the frame and it is so arranged that when the mechanism is in its normal position the spring will hold the actuating device in its lowermost or inoperative position. As the sleeve 28 is moved rearwardly, under the influence of the governor, the arm 46 of the plunger actuating device will be moved upwardly until the line extending between the points at which the spring is connected with the arm 46 and with the frame is moved across the axis of the arm. As soon as this takes place the pull of the spring on the arm will tend to move the same upwardly and the actuating device will be quickly operated to move the plunger 26 into its operative position, that is, into the path of the shoulder 25 on the nut. This movement of the actuating device takes place independently of the bar 42 and of the sleeve 28, this independent movement being permitted by the pin and slot connection between the actuating device and the bar. The plunger having been moved into the path of the shoulder on the nut will prevent the further rotation of the nut and thus cause the same to be moved rearwardly by the screw threaded shaft, thereby causing the actuating device to operate the clutch or other part which is to be operated to reduce the speed of the vehicle. As soon as this has been done the speed of the vehicle will be gradually lowered until it is again below the predetermined limit. As the governor thus moves toward its normal or innermost position the sleeve 28 is moved forwardly by the spring 36 and the actuating device for the plunger moves downwardly. There is the same delay in the lowering operation for the plunger as there is in the elevating operation, that is, the initial movement of the actuating device in its reverse direction will not operate the plunger, consequently the nut will not be released by a slight reduction in speed but the speed must fall below the fixed limit. When the plunger has been again moved out of the path of the stop on the nut the nut will be free to rotate with the shaft 10 or relatively thereto and the forward pull exerted upon the actuating device by the spring of the clutch, or other part to be actuated, will cause the nut to rotate on the shaft in a direction to move the nut forwardly, thus restoring the device to its inoperative position.

If desired, the apparatus may be utilized for controlling an electrical circuit, either to actuate a signal as the vehicle approaches the speed limit or to interrupt the ignition circuit. In the present device, I have mounted within the casing 2 resilient contact arms 49 and 50 which are connected with a signal circuit 51 and the upper portions of which are arranged in the path of a projection or lug 52 carried by the actuating bar 42. These contacts are so arranged with relation to the projection 52 that as the governor moves outwardly, due to the increase of speed, the projection will engage the contact 49 and move it into engagement with the contact 50 just before the speed limit is reached, thus causing the signal, which may be either audible or visible, to be operated to warn the driver. A second pair of resilient contact members 53 and 54 are arranged in line with the contact member 50 and the contact member 53 is connected with the ignition circuit 55 while the contact member 54 is grounded, as shown at 56. It will be apparent, therefore, that the further movement of the projection 52 under the influence of the governor will cause the contact members 54 and 53 to be brought into engagement, thereby grounding the ignition circuit and interrupting the operation of the engine.

As has been heretofore stated, the connections between the driven shaft 16 and the motor and the connections between the actuating device and the part to be operated, may be of any suitable character. In that form of the device shown in Figs. 6 and 7, I have illustrated another arrangement of these connections for the purpose of facilitating the application of the device to certain types of vehicles. As there shown, the mechanism is the same as that shown in Figs. 1 and 2 but instead of connecting the shaft 16 with the motor on the outside of the casing 1, I have established the connection within the casing near the forward end of the shaft. For this purpose I have mounted on the forward portion of the shaft a worm wheel 60 which, in the present instance, is rigidly secured to and, if desired, may be formed integral with the friction disk 22 which is carried by the shaft 16. Extending transversely to the shaft 16 is a shaft 61 which is journaled in bearings 62 carried by the frame 1 and is provided with a worm 63 which meshes with the worm wheel 60. One end of the shaft 61 projects beyond the side of the casing and has secured thereto a spiral gear 64 which meshes with a corresponding spiral gear 65 rigidly secured to the propeller shaft 21, it being understood that these spiral gears may be arranged within or without the casing for the transmission gearing.

The actuating device or cross head 2 is connected with the part or parts to be actuated through a rock shaft arranged in the rear thereof. In Figs. 6 and 7 the rock shaft shown at 66 as journaled in suitable bearings 67 carried by the casing adjacent to but below the transverse shaft 61. One end of this shaft 66 projects beyond the side of the casing and has secured thereto a rock arm 68 with which is connected a rod 69 which leads to a clutch, brake or other part to be operated. The connection between the actuating device and the rock shaft may take various forms but, in the present construction, I have utilized the slide rods 70 which carry the cross head 2 and which are similar to the slide rods 3 with the exception that they need not extend through the forward end of the casing. Either one or both of these rods may be connected at their rear ends with the rock shaft and, in the present instance, I have shown links 71 pivotally connected to the rear ends of the respective slide rods and pivotally connected at their rear ends with rock arms 72 rigidly secured to the rock shaft 66, so that the rearward movement of the actuating device will rock the shaft 66 in a direction to actuate the part to be operated. In this manner the overall length of the device as a whole is materially shortened and a more compact arrangement is secured which is desirable in connection with certain types of vehicles.

While I have shown and described one embodiment of my invention I wish it to be understood that I do not desire to be limited to the details thereof as various modifications may appear to a person skilled in the art.

Having now fully described my invention, what I claim as new and desire to secure by Letters Patent, is:

1. In a speed controlling mechanism, a motor driven part, an actuating device, means for connecting said actuating device with a part to be operated, a shaft normally connected with said motor driven part, a connecting member mounted on said shaft for rotation therewith, said shaft and said member having cooperating parts to cause said member to move lengthwise of said shaft when said member is held against rotation, said connecting member being connected with said actuating device for rotation relatively thereto but being held against axial movement relatively to said actuating device, and means controlled by the speed of said motor driven part to control the rotation of said connecting member.

2. In a speed controlling mechanism, a motor driven part, an actuating device, means for connecting said actuating device with a part to be operated, a shaft, a frictional driving connection between said shaft and said motor driven part, a connecting member mounted on said shaft for rotation therewith, said shaft and said member having cooperating parts to cause said member to move lengthwise of said shaft when said member is held against rotation, said connecting member being connected with said actuating device for rotation relatively thereto but being held against axial movement relatively to said actuating device, and means controlled by the speed of said motor driven part to control the rotation of said connecting member.

3. In a speed controlling mechanism, a motor driven part, an actuating device, means for connecting said actuating device with a part to be operated, a shaft normally connected with said motor driven part and having a spiral rib, a nut mounted on said shaft, rotatably connected with said actuating device and held against axial movement relatively thereto, and means controlled by the speed of said motor driven part to hold said nut against rotation.

4. In a speed controlling mechanism, a motor driven part, an actuating device, means for connecting said actuating device with a part to be operated, a shaft normally connected with said motor driven part and having a spiral rib, a nut mounted on said shaft, rotatably connected with said actuating device and held against axial movement relatively thereto, a stop movable into the path of a part carried by said nut, and means controlled by the speed of said motor driven part to actuate said stop.

5. In a speed controlling mechanism, a motor driven part, an actuating device, means for connecting said actuating device with a part to be operated, a shaft normally connected with said motor driven part and having a spiral rib, a nut mounted on said shaft, rotatably connected with said actuating device and held against axial movement relatively thereto, a stop mounted for movement into the path of a part carried by said nut, a centrifugal governor adapted to be actuated by said motor driven part, and means controlled by said governor for actuating said stop.

6. In a speed controlling mechanism, a motor driven part, an actuating device, means for connecting said actuating device with a part to be operated, a shaft normally connected with said motor driven part and having a spiral rib, a nut mounted on said shaft, rotatably connected with said actuating device and held against axial movement relatively thereto, a stop mounted for movement into and out of the path of a part carried by said nut, a centrifugal governor actuated by said motor driven part, an actuating device for said movable stop, means controlled by said governor to impart initial movement to said actuating device, and other means to quickly complete the movement of said actuating device.

7. In a speed controlling mechanism, a motor driven part, an actuating device, means for connecting said actuating device with a part to be operated, a shaft normally connected with said motor driven part and having a spiral rib, a nut mounted on said shaft, rotatably connected with said actuating device and held against axial movement relatively thereto, a stop mounted for movement into and out of the path of a part carried by said nut and having an opening, an actuating device comprising an arm extending into said opening, said opening being of such length that the initial movement of said arm will not actuate said stop, a centrifugal governor actuated by said motor driven part, an operative connection between said governor and the actuating device for said stop to impart initial movement to said actuating device, and a spring to impart final movement to said actuating device for said stop.

8. In a speed controlling mechanism, a motor driven part, an actuating device, means for connecting said actuating device with a part to be operated, a shaft normally connected with said motor driven part and having a spiral rib, a nut mounted on said shaft, rotatably connected with said actuating device and held against axial movement relatively thereto, a stop mounted for movement into and out of the path of a part carried by said nut, an actuating device for said stop, a centrifugal governor actuated by said motor driven part, a reciprocatory member arranged to be actuated by said governor, and an operative connection between said reciprocatory member and said actuating device.

9. In a speed controlling mechanism, a shaft, an actuating device, means for connecting said actuating device with a part to be operated, a second shaft normally connected with the first mentioned shaft and having a spiral rib, a nut mounted on said second shaft, rotatably connected with said actuating device and held against axial movement relatively thereto, a stop mounted for movement into and out of the path of a part carried by said nut, an actuating device for said stop, a sleeve mounted on the first mentioned shaft, a centrifugal governor carried by said first mentioned shaft and arranged to actuate said sleeve, and an operative connection between said sleeve and the actuating device for said stop.

10. In a speed controlling mechanism, a shaft, an actuating device, means for connecting said actuating device with a part to be operated, a second shaft normally connected with the first mentioned shaft and having a spiral rib, a nut mounted on said second shaft, rotatably connected with said actuating device and held against axial movement relatively thereto, a stop mounted for movement into and out of the path of a part carried by said nut, an actuating device for said stop, a sleeve mounted on the first mentioned shaft, a centrifugal governor carried by said first mentioned shaft and arranged to actuate said sleeve, means actuated by said sleeve for imparting initial movement to the actuating device for said stop, and a spring connected with said actuating device to impart final movement thereto.

11. In a speed controlling mechanism, two shafts mounted in axial alinement, a frictional driving connection between said shafts, means for positively rotating one of said shafts, a centrifugal governor actuated by said positively driven shaft, the other of said shafts having a spiral rib, a nut mounted on said ribbed shaft, an actuating device, said nut being rotatably connected with said actuating device but held against axial movement with relation thereto, a stop mounted for movement into and out of the path of a part carried by said nut, and means actuated by said governor to control the movement of said stop.

12. In a speed controlling mechanism, two shafts mounted in axial alinement, a frictional driving connection between said shafts, means for positively rotating one of said shafts, a centrifugal governor actuated by said positively driven shaft, the other of said shafts having a spiral rib, a nut mounted on said ribbed shaft, an actuating device, said nut being rotatably connected with said actuating device but held against axial movement with relation thereto, a stop mounted for movement into and out of the path of a part carried by said nut, a bell crank lever having one end arranged in operative relation to said stop, a sleeve mounted on said positively rotated shaft and arranged to be actuated by said governor, an actuating bar operatively connected with said sleeve and having a slot in one end thereof, a pin carried by the other arm of said bell crank lever and extending into said slot, whereby the movement of said sleeve under the influence of said governor will impart final movement to said bell crank lever in either direction, and a spring acting on said bell crank lever to impart final movement thereto in either direction.

13. In a speed controlling mechanism, a motor driven part, a shaft operatively connected with said motor driven part and having a screw threaded portion, a nut mounted on said screw threaded portion of said shaft, a cross head mounted on said nut, said nut being rotatably connected with said cross head and held against axial movement with relation thereto, actuating rods connected with said cross head, means for connecting said actuating rods with a part to be operated, a governor actuated by said motor driven part, and means controlled by said governor for controlling the rotation of said nut.

14. In a speed controlling mechanism, a positively rotated shaft, a governor actuated thereby, a second shaft normally connected with and driven by said positively rotated shaft, an actuating device supported by said second shaft and adapted to be connected with a part to be operated, and means controlled by said governor to cause said second shaft to impart operative movement to said actuating device.

15. In a speed controlling mechanism, a positively rotated shaft, a governor actuated thereby, a second shaft driven by said positively rotated shaft, an actuating device adapted to be connected with a part to be operated, means controlled by said governor to establish an operative connection between said actuating device and said second shaft, a signal circuit, a circuit breaker and closer for said signal circuit, and means actuated by said governor to close said circuit breaker and closer before the operative connection is established between said actuating device and said second shaft.

16. In a speed controlling mechanism, a positively rotated shaft, a governor actuated thereby, a second shaft driven by said positively rotated shaft, an actuating device adapted to be connected with a part to be operated, means controlled by said governor to establish an operative connection between said actuating device and said second shaft, an electrical circuit, resilient contact members connected with said circuit and held normally out of engagement one with the other, and a part actuated by said governor and arranged to engage one of said contact members and move it into contact with the other contact member.

17. In a speed controlling mechanism, a positively rotated shaft, a governor actuated thereby, a second shaft driven by said positively rotated shaft, an actuating device adapted to be connected with a part to be operated, means controlled by said governor to establish an operative connection between said actuating device and said second shaft, a plurality of electrical circuits, a pair of yieldable contact members connected in each of said circuits, said contact members being arranged in alinement one with the other, and a part actuated by said governor and arranged to move the two contact members of the several pairs successively into contact one with the other.

18. In a speed controlling device, a shaft, a worm wheel connected with said shaft, a second shaft, a worm carried by said second shaft and meshing with said worm wheel, means for connecting said second shaft with a motor driven part, an actuating device, means controlled by the speed of rotation of the first mentioned shaft for establishing an operative connection between said actuating device and said first mentioned shaft, and means for connecting said actuating device with a part to be operated.

19. In a speed controlling device, a shaft, a worm wheel connected with said shaft, a second shaft, a worm carried by said second shaft and meshing with said worm wheel, spiral gearing for connecting said second shaft with a propeller shaft, an actuating device, means controlled by the speed of rotation of the first mentioned shaft for establishing an operative connection between said actuating device and said first mentioned shaft, and means for connecting said actuating device with a part to be operated.

20. In a speed controlling device, two shafts arranged in longitudinal alinement, opposed friction disks secured to the respective shafts to connect the same one to the other, a worm gear connected with the friction disk of one of said shafts, a transverse shaft, a worm gear carried by said transverse shaft and meshing with the first mentioned worm gear, means for connecting said transverse shaft to a motor driven part, an actuating device, and means controlled by the speed of rotation of the shaft having the first mentioned worm gear for establishing an operative connection between the other shaft and said actuating device, and means for connecting said actuating device with a part to be operated.

21. In a speed controlling device, a motor driven part, an actuating device, a slide rod rigidly secured to said actuating device to support the same, means controlled by the speed of said motor driven part to establish an operative connection between the same and said actuating device, a rock shaft having means for connecting the same to a part to be operated, an arm secured to said rock shaft, and a link connecting said rock shaft with said slide rod.

22. In a speed controlling device, a casing, a motor driven shaft mounted on said casing, a screw threaded shaft mounted in said casing and operatively connected with said motor driven shaft, a nut mounted on said screw threaded shaft, rods slidably mounted in said casing on opposite sides of said screw threaded shaft, a cross head carried by said rods, a nut rotatably connected with said cross head but held against axial movement relatively thereto, a rock shaft journaled in said casing and having one end extending beyond the same, means for connecting said shaft with a part to be operated, arms rigidly secured to said rock shaft within said casing, links connecting the respective arms with said slide rods, a transverse shaft journaled in said casing and having driving connection with said motor driven shaft, and means for operatively connecting said transverse shaft with a motor driven part.

23. In a speed controlling mechanism, a motor driven part, an actuating device, means for connecting said actuating device with a part to be operated, operating means for said actuating device having operative connection with said motor driven part, a member movable into and out of position to cause an operative connection to be established between said operating means and said actuating device, means controlled by the speed of said motor driven part to impart initial movement to said member, and other means to impart a quick final movement to said member.

24. In a speed controlling mechanism, a motor driven part, an actuating device, means for connecting said actuating device with a part to be operated, a device movable into and out of a position to cause an operative connection to be established between said operating means and said actuating device, means controlled by the speed of said motor driven part to impart initial movement to said movable device, and other means to impart a quick final movement to said movable device.

In testimony whereof, I affix my signature hereto.

FREDERICK O. GRAY.